US005471356A

United States Patent [19]
Tsuji

[11] Patent Number: 5,471,356
[45] Date of Patent: Nov. 28, 1995

[54] AUTO-EJECT DEVICE FOR DISC PLAYERS HAVING COMPACT TWIN CAM MOTOR UNIT

[75] Inventor: Kiyoaki Tsuji, Kanagawa, Japan

[73] Assignee: Sony Corporation, Tokyo, Japan

[21] Appl. No.: 263,197

[22] Filed: Jun. 21, 1994

[30] Foreign Application Priority Data

Jun. 25, 1993 [JP] Japan .................................. 5-177555

[51] Int. Cl.$^6$ ...................... G11B 17/04; G11B 5/016; G11B 33/02
[52] U.S. Cl. ...................... 360/99.03; 360/99.07; 369/77.2
[58] Field of Search .................. 360/99.06, 99.07, 360/96.5, 99.03; 369/77.1, 77.2; 242/338.4, 339

[56] References Cited

U.S. PATENT DOCUMENTS

| | | | |
|---|---|---|---|
| 4,670,802 | 6/1987 | Ogawa et al. | 360/97 |
| 4,835,635 | 5/1989 | Sasaki et al. | 360/96.5 |
| 4,868,924 | 9/1989 | Ando et al. | 360/96.5 |
| 5,126,899 | 6/1992 | Kanazawa | 360/99.07 |
| 5,274,523 | 12/1993 | Tomita et al. | 360/96.5 |
| 5,297,117 | 3/1994 | Uzuki et al. | 369/75.2 |
| 5,335,124 | 8/1994 | Yokota | 360/99.06 |

*Primary Examiner*—Robert S. Tupper
*Assistant Examiner*—Brian E. Miller
*Attorney, Agent, or Firm*—Ronald P. Kananen

[57] ABSTRACT

To promote reduction of the size and thickness of an auto-eject device for a disc player, an auto-eject device for a disc player in which a cassette holder 34 and a slide plate 45 are mounted on a chassis 21 is characterized in that an auto-eject motor is constructed to have a generally square top shape and is flat, and in that the auto-eject motor 55 is screwed to the chassis 21 such that its output cam 61 is arranged normal to a driven plate 49 of the slide plate 45.

5 Claims, 18 Drawing Sheets

AUTO-EJECT DEVICE FOR DISC PLAYERS HAVING COMPACT TWIN CAM MOTOR UNIT

BACKGROUND OF THE INVENTION

1. Technical Field

The present invention relates to a disc player suitable for recording/playing a floppy disc of for example 3.5 inches, and more particularly to an auto-eject device for a disc player, which effects auto-ejection using an auto-eject motor.

2. Description of the Prior Art

A prior art auto-eject device for recording/playing a 3.5 inch type of floppy disc includes: a loading member called a "cassette holder" for reciprocating a disc cassette, which contains a floppy disc, perpendicularly to a chassis between an elevated loading start position and a lowered loading end position; a loading drive member called the "slide plate", adapted to reciprocate in parallel with said chassis for driving said cassette holder reciprocally between the elevated position and the lowered position; and an auto-eject motor mounted on the chassis.

During the loading operation, after the disc cassette is inserted into the cassette holder in its elevated position, the slide plate which is in its returned position is released from its locked state by a trigger arm, and is slid to its forwarded position by a spring so that the cassette holder is driven from the elevated position to the lowered position by the slide plate to load the floppy disc in the disc cassette onto a disc table.

During ejection, on the other hand, when an eject switch is turned ON, an output cam is driven by the auto-eject motor so that the slide plate is slid from its forwarded position to its returned position against a slide plate spring until it is locked again in the returned position by the trigger arm.

The cassette holder is elevated from the lowered position to the elevated position by the slide plate so that the disc cassette is auto-ejected.

The auto-eject motor, which is made of a geared motor and used in the auto-eject device of a disc player according to the prior art, is exemplified in FIGS. 1 to 3.

This prior art auto-eject motor 1 is constructed by mounting a motor (e.g., DC motor) 3 horizontally on one end portion 2a of a housing 2 having a generally L-shape (as seen in plan) arranging a cam gear 5 or an output gear, which is formed with an output cam 4 on its lower face, at the leading end of the other end portion 2b, and mounting a gear train 6, which is composed of a plurality of reduction gears, in the other end portion 2b. On the motor shaft 3a of the motor 3, there is fixed a worm 7, which is in meshing engagement with a worm wheel 8 acting as an input gear of the gear train 6. The output cam 4 and the cam gear 5 protrude to the outside from apertures 9 and 10 which are formed in the bottom face and the side face of the housing 2.

Mounted directly above the cam gear 5 in the other end portion 2b of the housing 2 is a position detector 11 for detecting the position of the output cam 4. This position detector 11 is composed of a magnet adhered to the upper face of the cam gear 5, and a Hall element (although neither is shown) for detecting the position of the magnet.

A pair of input/output terminals 12 for the motor 3 protruded over the top face of the housing 2 and a pair of input/output terminals 13 for the position detector 11 are soldered to a flexible printed circuit board 14 having a generally F-shaped top plan shape. These input/output terminals 12 and 13 are connected by the flexible printed circuit board 14 with a non-illustrated board which is mounted in another position on a chassis 15.

The auto-eject motor 1 is mounted on the chassis 15 of the disc player horizontally with its output cam 4 directed downward, by means of a screw 16 and a positioning pin 17, and is constructed to drive a driven plate 18a of a slide plate 18, which is slidable in parallel over the chassis 15, in the direction of the arrow, using the output cam 4.

However, an auto-eject motor 1 according to this type of prior art is equipped with the generally L-shaped housing 2 and therefore has a profile which is so large that size reduction of the disc player is restricted. Further, since the driven plate 18a of the slide plate 18 is sandwiched between the housing 2 and the chassis 15 when the auto-eject motor 1 is screwed on the chassis 15, the slide plate 18 cannot be removed until the auto-eject motor 1 is removed. This induces the problem that it is troublesome to assemble/disassemble the disc player.

SUMMARY OF THE INVENTION

The present invention has been conceived to solve the above-specified problem and is directed to the reduction of the size and thickness of an auto-eject device for a disc player and the simplification of the assembly and disassembly of the arrangement.

In order to achieve the above-specified object, according to the present invention, there is provided an auto-eject device for a disc player, comprising: a loading member for reciprocating a recording and/or playing disc perpendicularly to a chassis between a loading start position and a loading end position; a loading drive member adapted to reciprocate in parallel with said chassis for driving said loading member reciprocally between said loading start position and said loading end position; and an auto-eject motor mounted on said chassis for ejecting said loading member from said loading end position to said loading start position by driving said loading drive member from a forward position to a backward position when said disc is loaded in said loading end position, wherein said auto-eject motor has its motor arranged in parallel with an output camshaft and has a generally square top plan shape and a flattened construction, and wherein said auto-eject motor is mounted on said chassis such that said output camshaft is arranged normal to a driven plate of said loading drive member to drive said driven plate by an output cam at its leading end.

The auto-eject device for a disc player thus constructed, as described above, can have its size reduced by arranging the motor of the auto-eject motor and the output camshaft in parallel with each other. Since, moreover, the auto-eject motor is so mounted on the chassis that its motor and the output camshaft are arranged in parallel with the chassis, the auto-eject device can be made thin. Still, moreover, the output camshaft takes a position perpendicular to the driven member of the loading drive member when the auto-eject motor is mounted on the chassis, and the auto-eject motor and the loading drive member can be assembled together and disassembled from each other with respect to the chassis because the output camshaft is positioned normal to the driven plate of the loading drive member.

DETAILED DESCRIPTION OF THE PREFERRED EMBODIMENT

Figure 1:
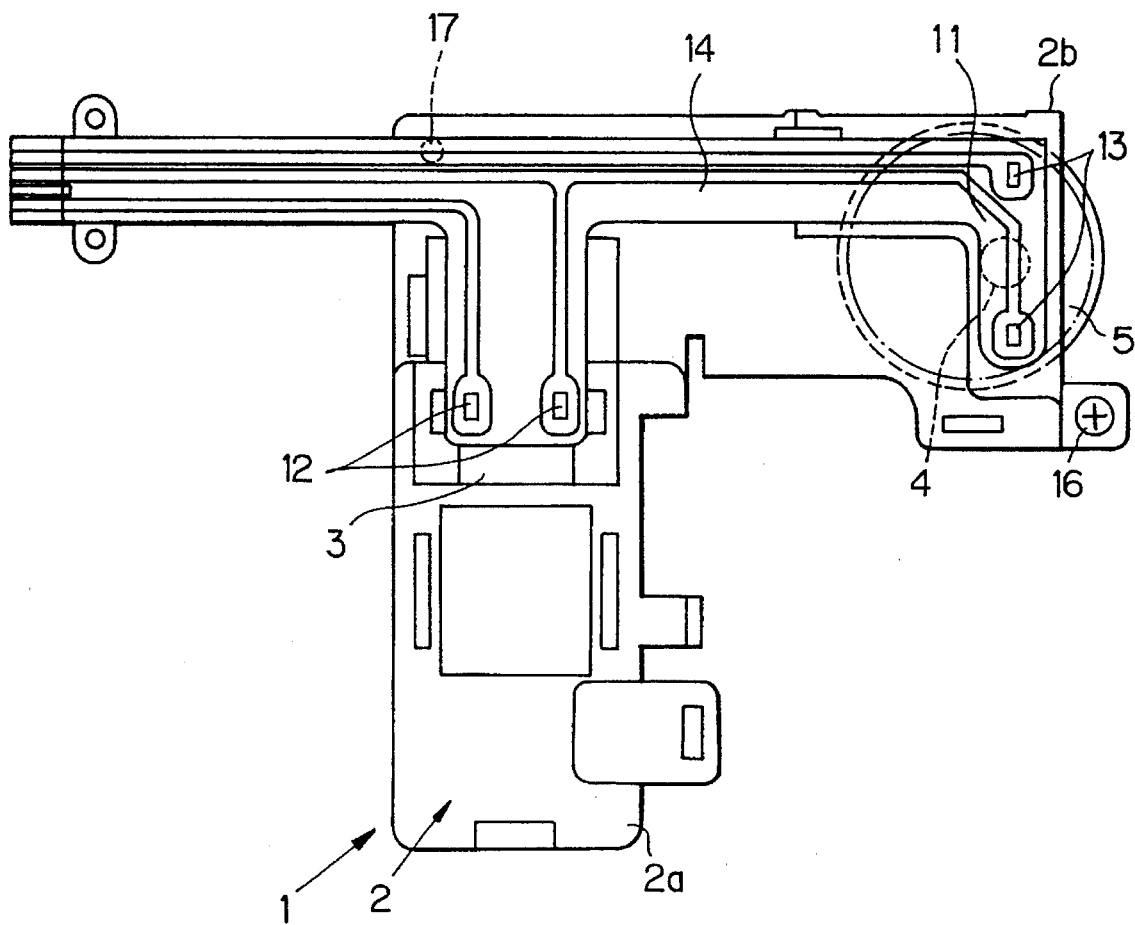
FIG. 1 is a top plan view showing an auto-eject motor according to the prior art.

An embodiment of an auto-eject device for a disc player according to the present invention will be described.

First, the auto-eject device for a disc player will be described with reference to FIGS. 13 to 18.

In two locations on the front-rear longitudinal centerline of a chassis 21 (wherein: arrow a' indicates the forward direction; and arrow a indicates the backward direction), as shown in FIGS. 13 to 18, there are mounted a disc table 23 which is rotationally driven by a spindle motor 22, and a head moving mechanism 24. This head moving mechanism 24 is constructed by mounting magnetic heads 27 on a carriage 25 and an arm 26 hinged to the carriage 25. The carriage is driven by a stepping motor 28 through a lead screw 29.

Moreover, the chassis 21 is formed with parallel righthand and lefthand side plates 21a which provide a U-shaped section. These righthand and lefthand side plates 21a have a pair of righthand and lefthand vertical guide grooves 30 formed at their longitudinal (as taken in the directions of arrows a and a') central positions. A rotary damper 31 is attached to the rear end (as taken in the direction of arrow a) of one side plate 21a.

A cassette holder 34 acting as the loading member is provided on its lower portion with a pair of righthand and lefthand cassette insertion guides 34a which have generally L-shaped sections. The cassette holder 34 is provided on its righthand and lefthand side faces with a pair of righthand and lefthand guide pins 35 in longitudinally central positions and with a left pair and a right pair of horizontal guide pins 36 at each of the two longitudinal ends.

On one side portion of the rear end of the cassette holder 34, there is a trigger arm 37 which is hinged so that it can turn in the directions of arrows c and c' through a vertical pivot pin 38. This trigger arm 37 is rotationally urged in the direction of arrow c' by a trigger arm spring 39.

The cassette holder 34 is provided in the rear portion with an arm insertion hole 40. On the cassette holder 34 to the outer side of the arm insertion hole 40, there are mounted a load arm 41, a load slider 42 and a load slider spring A slide plate 45 acting as the loading drive member is provided on its lower portion with two parallel righthand and lefthand side plates 45a so that it is formed into a downward C-shaped section. The righthand and lefthand side plates 45a are formed at their two longitudinally front and rear portions with two pairs of parallel inclined guide grooves 46.

A pair of elongated righthand and lefthand slots 47 formed in the slide plate 45, include a pair of righthand and lefthand slide leaf springs 48 which are longitudinally arranged in parallel between the slide plate 45 and the cassette holder 34.

On the other hand, a portion of one side plate 45a of the slide plate 45 functions as a driven plate 49 which is driven by a later-described auto-eject motor. This driven plate 49 is provided at its rear end with a cam follower piece 49a in the form of a cam follower part bent inward substantially at a right angle. The rear end of the slide plate 45 is bent at its one side portion vertically downward to form a lock member 50, which cooperates with the trigger arm 37 for locking the slide plate 45 in a returned position. The slide plate 45 is provided with a large notch 51 and an opening 52.

The slide plate 45 is fitted in between the two righthand and lefthand side plates 21a of the chassis 21 and is so assembled as can be slid on the chassis 21 horizontally in the longitudinal directions of arrows a and a' by a horizontal guide mechanism (not shown).

Moreover, the assembly is made such that the cassette holder 34 is disposed horizontally between the two righthand and lefthand side plates 45a below the slide plate 45. At this time, the paired righthand and lefthand guide pins 35 of the slide plate 45 are loosely fitted in the paired righthand and lefthand vertical guide grooves 30 of the chassis 21, and such that the two pairs, four pins in total, of righthand and lefthand guide pins 36 are loosely fitted in the two pairs, four grooves in total, of inclined guide grooves 46 of the two righthand and lefthand side plates 45a of the slide plate 45.

An auto-eject motor 55 which has a generally square top plan shape and a flattened shape, is secured by a single screw 56 on the rear end of the chassis 21 and inside of the drive plate 49 of the slide plate 45. The auto-eject motor 55 is positioned by a guide pin 57 formed on the chassis 21.

In this auto-eject motor 55, a DC motor 58 and an output camshaft 59 are mounted so as to be horizontal and parallel and so as to be normal to a plane of the driven plate 49. An output cam 61 which is fixed to the leading end of the output camshaft 59 through a cam gear 60, is included in the auto-eject motor 55 inboard of the driven plate 48 and in front (as taken in the direction of arrow a') of the cam follower 49a.

On the rear end of the chassis 21 and to the side of the head moving mechanism 24, a circuit board 81 is secured by means of a plurality of screws 82. The motor 58 of the auto-eject motor 55 and a flexible printed circuit board 83 soldered to the input/output terminals of the later-described microswitch, are connected with a connector 84 mounted on the circuit board 81. The stepping motor 28 also has its input/output terminals (not shown) connected with the connector (also not shown) on the circuit board 81 by the similar flexible printed circuit board 83.

According to the auto-eject device for a disc player, the cassette holder 34, the slide plate 45, the auto-eject motor 55 and the circuit board 81 can be sequentially laid down and assembled on the chassis 21 in the recited order.

Since the output cam 61 of the auto-eject motor 55 is arranged normal to the driven plate 49 of the slide plate 45, the slide plate 45 and auto-eject motor 55 can be assembled and disassembled independently of each other without any mutual restriction with respect to the chassis 21. Thus, it is possible to facilitate assembly and disassembly of the slide plate 45 and auto-eject motor 55 thereby facilitating maintenance, inspection and repair of the auto-eject device.

Since, the auto-eject motor 55 is flattened to have a small size and is light weight, as will become apparent hereinafter, the space for mounting it on the chassis 15 can be reduced thus reducing the size and weight of the entire auto-eject device for the disc player.

When the disc player auto-eject device is in its assembled state, the arm 26 of the head moving mechanism 24 has a portion which abuts against the load arm 41 on the cassette holder 34 under the action of a bias spring (not shown). A rack 42a formed at the rear end of the load slider 42 is in meshing engagement with a pinion 31a of the rotary damper 31.

The operations of the disc player auto-eject device thus constructed will now be described.

First, a floppy disc of 3.5 inches for recording and/or reproducing operations which has a generally square shape is fitted into a flat disc cassette 91.

Figure 14:
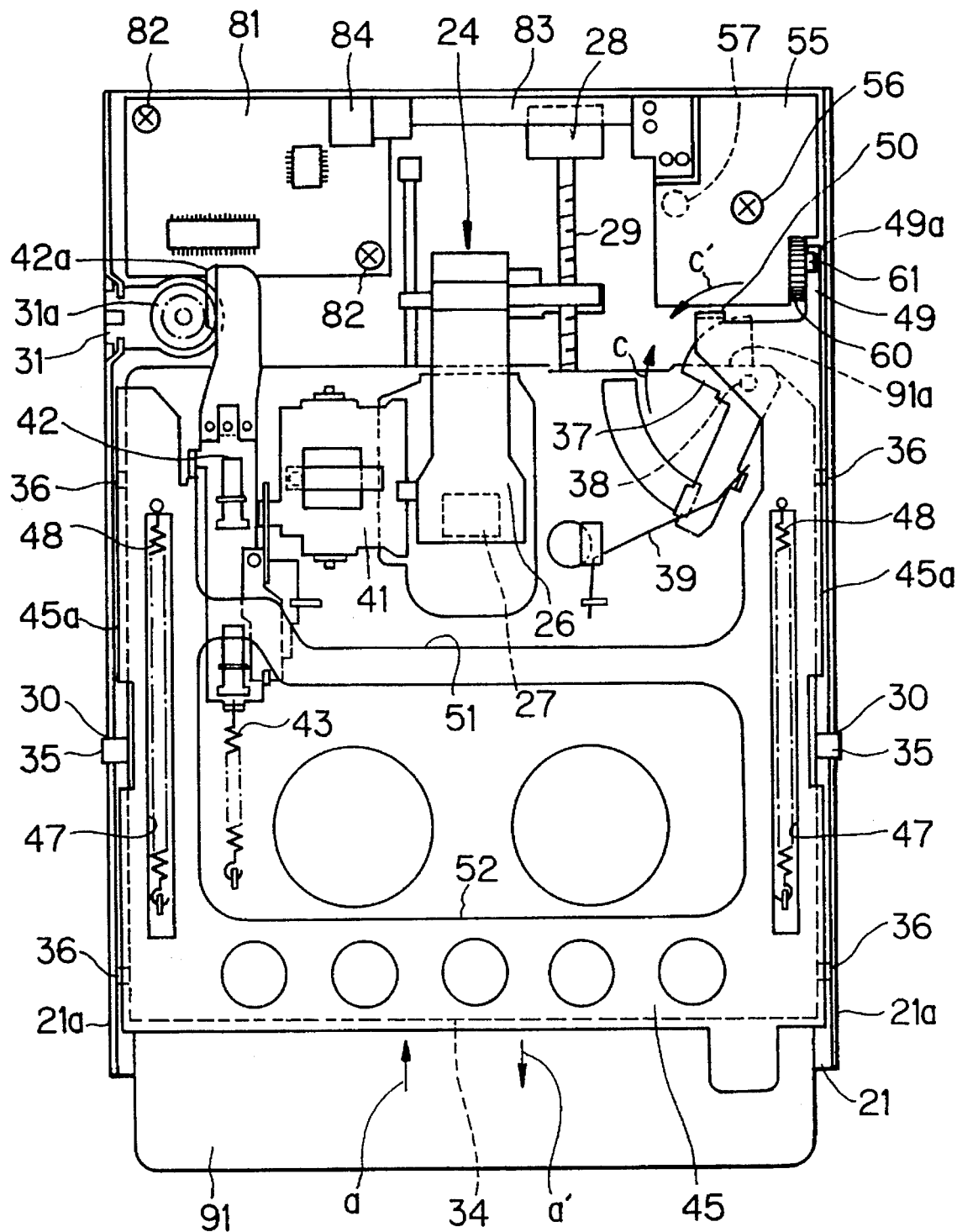
FIG. 14 is a top plan view showing the ejecting state of the disc player auto-eject device.
Figure 16:
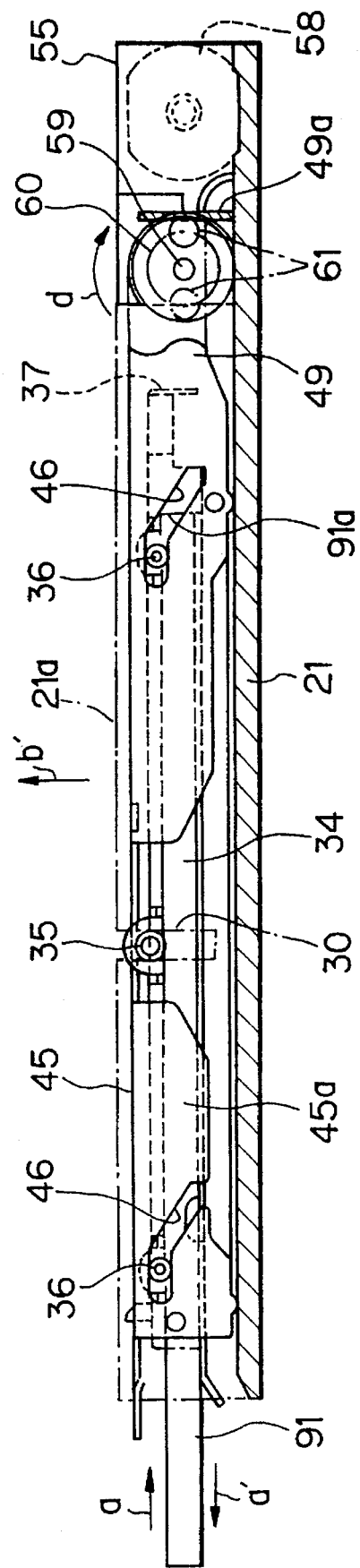
FIG. 16 is a partially cut-away side elevation of FIG. 14.

In the ejected state, as shown in FIGS. 14 and 16, the slide plate 45 is returned over the chassis 21 in the direction of arrow a to the returned position against the pair of slide leaf springs 48 until it is locked by the trigger arm 37.

When the four guide pins 36 of the cassette holder 34 are elevated by the four inclined guide grooves 46 of the slide plate 45, as shown in FIG. 16, the paired righthand and lefthand guide pins 35 of the cassette holder 34 are guided by the paired righthand and lefthand guide grooves 30 of the chassis 21 so that the cassette holder 34 is horizontally elevated to the elevated position in the direction of arrow b', i.e., to the loading start position.

Figure 7:
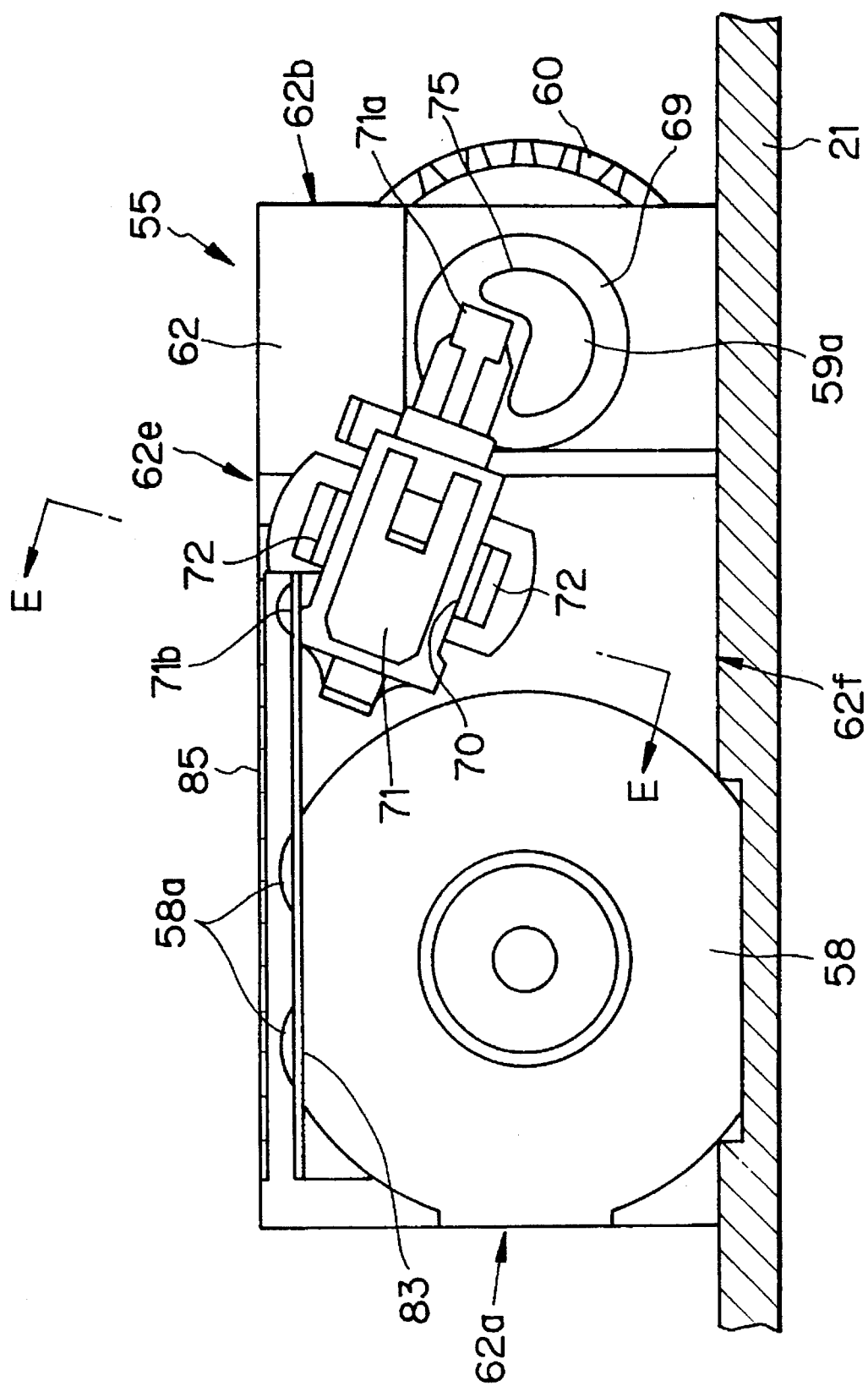
FIG. 7 is a view taken in the direction of arrows B—B of FIG. 4.
Figure 8:
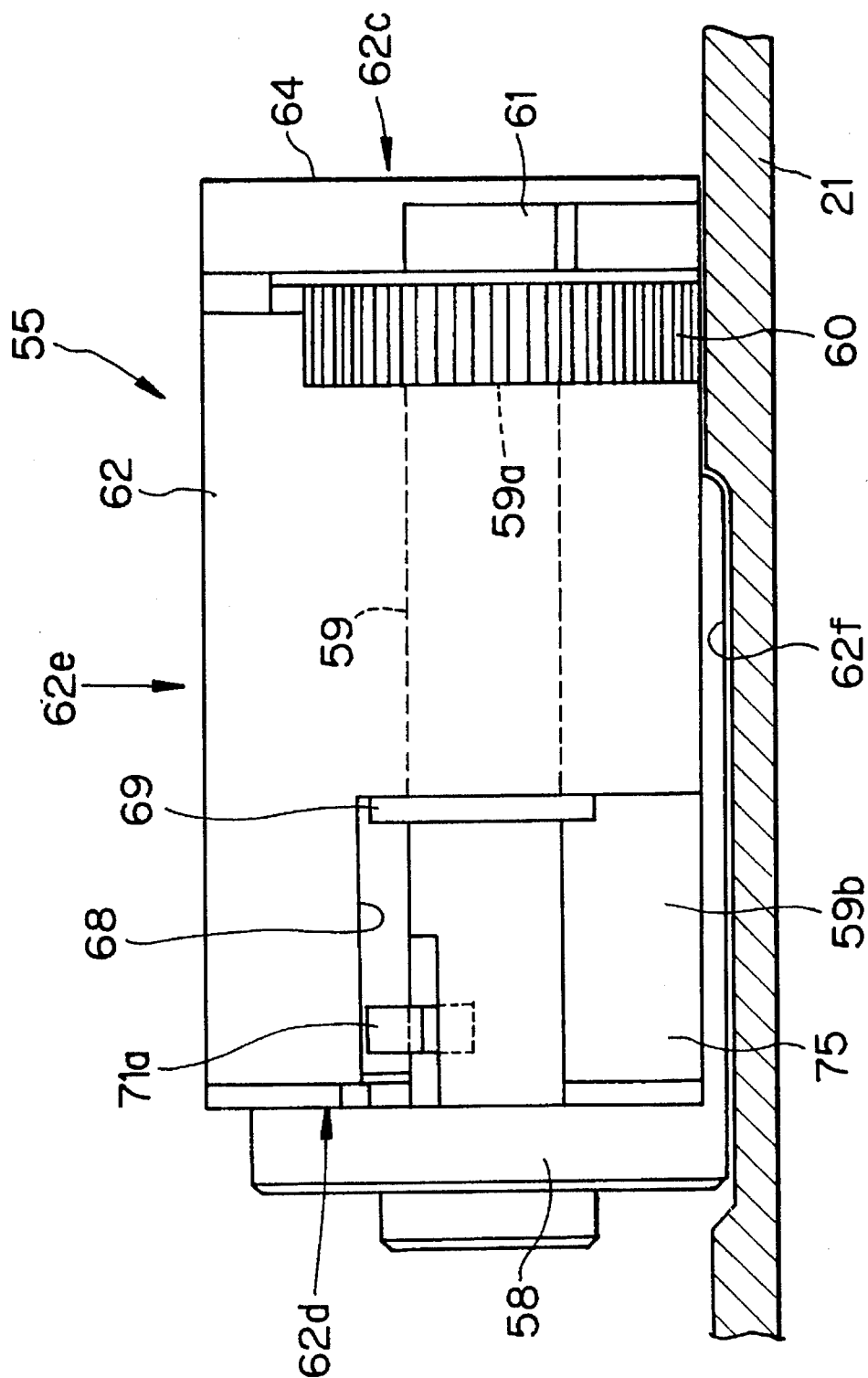
FIG. 8 is a view taken in the direction of arrows C—C of FIG. 4.
Figure 9:
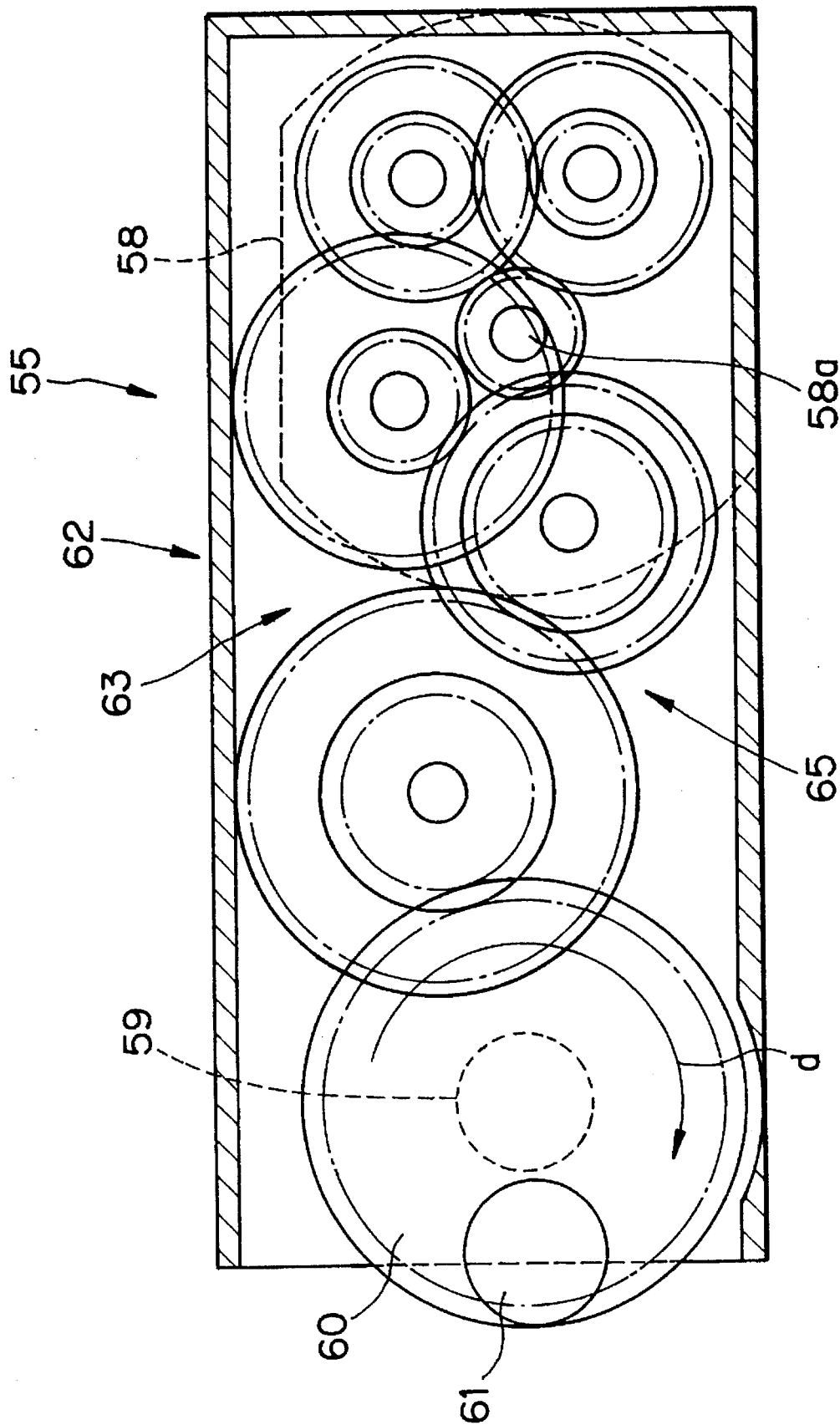
FIG. 9 is a view taken in the direction of arrows D—D of FIG. 4.

In this ejection end position, the output cam 61 is returned to the returned position, which is displaced in the direction of arrow a' from the output camshaft 59, as indicated by solid lines in FIG. 7.

Figure 18:
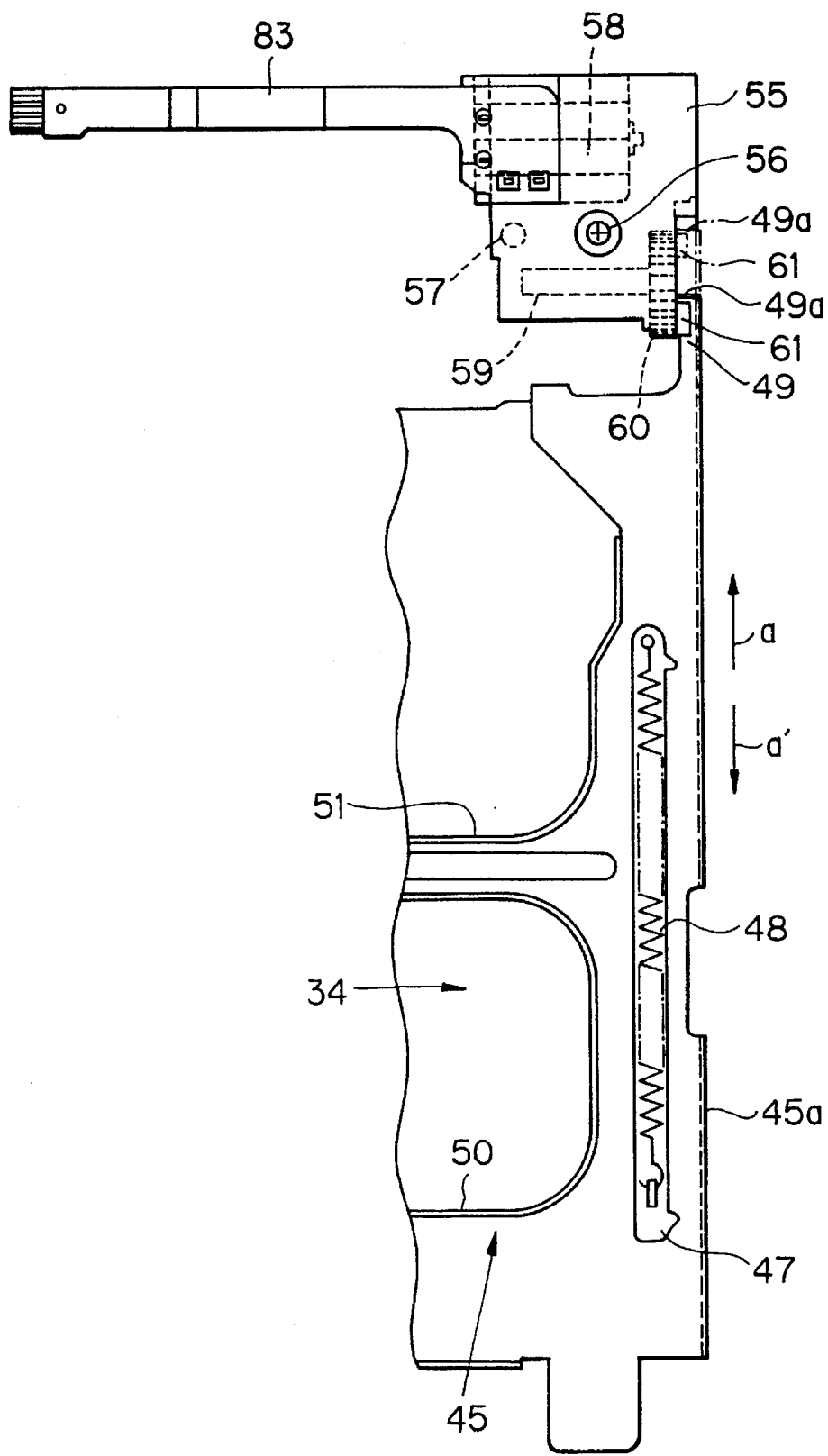
FIG. 18 is a top plan view showing the relation between a slide plate and the auto-eject motor in an enlarged scale.

During loading, as shown in FIGS. 14 and 18, the disc cassette 91 is inserted manually by the operator in the direction of arrow a horizontally between the paired righthand and lefthand cassette insertion guides 34a of the cassette holder 34.

Immediately before the floppy disc in the disc cassette 91 reaches the center of the disc table 23, the end face of the disc cassette 91, as taken in the direction of arrow a, i.e., a front end face 91a rotates the trigger arm 37 in the direction of arrow c against the trigger arm spring 39.

Figure 15:
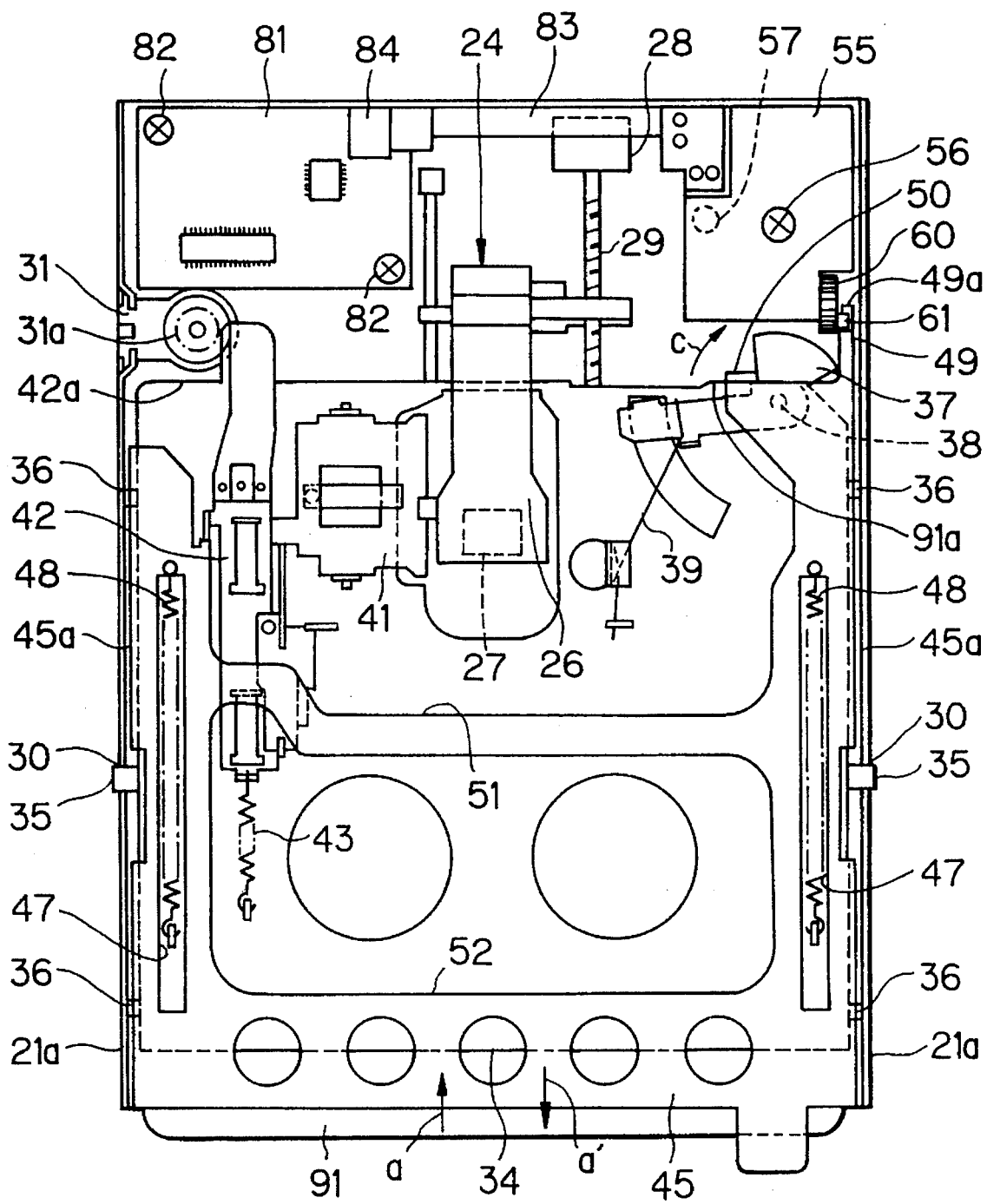
FIG. 15 is a top plan view showing the loading state of the disc player auto-eject device.
Figure 17:
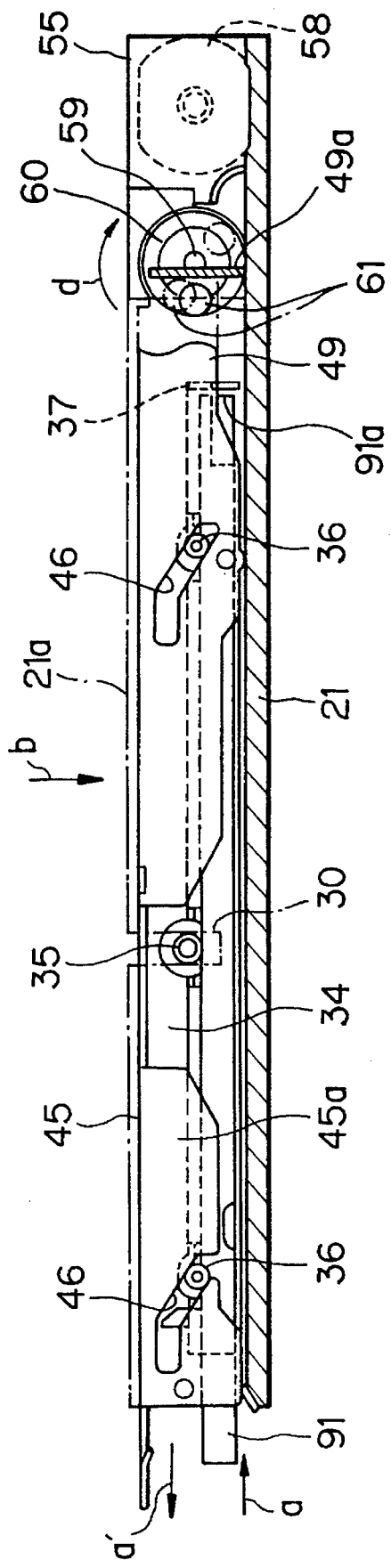
FIG. 17 is a partially cut-away side elevation of FIG. 15.

At the instant the floppy disc reaches the center of the disc table 23, as shown in FIG. 15, the locked member 50 is released from its locked state by the trigger arm 37. At this instant, the slide plate 45 is slid on the chassis 21 in the direction of arrow a' to the returned positions, as shown in FIGS. 15 and 17, by the action of the pair of slide leaf springs 48.

Then, the four guide pins 36 of the cassette holder 34 are depressed by the four inclined guide grooves 46 of the slide plate 45. As a result, the righthand and lefthand pairs of guide pins 35 of the cassette holder 34 are guided by the righthand and lefthand pairs of vertical guide grooves 30 so that the cassette holder 34 is instantly lowered to the lowered position, as taken in the direction of arrow b, i.e., to the loading end position.

With this, the disc cassette 91 is lowered horizontally in the direction of arrow b to the lowered position by the cassette holder 34 until it is fitted on the plurality of (not-shown) positioning pins on the chassis 21.

Thus, the floppy disc in the disc cassette 91 is loaded on the disc table 23 such that its bottom face comes into contact with the lower magnetic head 27 mounted on the carriage 25 of the head moving mechanism 24.

At this time, as shown in FIG. 15, the slide plate 45 is slid in the direction of arrow a' with respect to the cassette holder 34. As a result, the load slider 42 on the cassette holder 34 is slid in the direction of arrow a' by the load slider spring 43 so that its rack 42a drives the pinion 31a of the rotary damper 31 forward.

As a result, the load slider 42 is slowly slid in the direction of arrow a' while being decelerated by the rotary damper 31. The load arm 41 is slowly turned by the load slider 42 so that the arm 26 of the head moving mechanism 24a is slowly turned downward to bring the upper magnetic head 27 mounted on the arm 26 downward at a safe speed into contact with the top face of the floppy disc in the disc cassette 91.

Thus, the loading operation ends. As shown in FIG. 17, the slide plate 45 is slid in the direction of arrow a' to the returned position so that the cam follower 49a of the driven plate 49 comes close in the direction of arrow a' to the output cam 61 which has been returned to the returned position, as indicated by solid lines in FIG. 17.

After the end of the loading operation described above, the floppy disc in the disc cassette 91 is then rotated together with the disc table 23 by the spindle motor 22, and the carriage 25 and the arm 26 are moved together in the directions of arrows a and a' by the lead screw 29 which is rotationally driven by the stepping motor 28 of the head moving mechanism 24. The floppy disc is then scanned radially in the directions of arrows a and a' by the upper and lower magnetic heads 27 so that it is recorded or played, as desired.

Next, the auto-ejecting operations after the recording/ playing operations described above are carried out in the following manner. Specifically, when the (not-shown) eject switch is turned ON, the motor 58 of the auto-eject motor 55 is rotated so that the output cam 61 is rotated one turn in the direction of arrow a from the returned position, as indicated by solid lines in FIG. 17, until it is stopped again in the returned position.

First, the output cam 61 drives the cam follower 49a of the driven plate 49 in the direction of arrow a while it is rotated one half turn in the direction of arrow d to the half-rotated position, as indicated by solid lines in FIG. 16.

The slide plate 45 is then slid in the direction of arrow a against the pair of slide leaf springs 48 from the forwarded position, as shown in FIGS. 15 and 17, to the returned position, as shown in FIGS. 14 and 16.

By operations which are the reverse of the aforementioned loading operations, the cassette holder 34 is automatically elevated in the direction of arrow b' from the lowered position, as shown in FIG. 17, to the elevated position, as shown in FIG. 16, so that the disc cassette 91 is elevated from the lowered position to the elevated position by the action of the cassette holder 34.

As the disc cassette 91 rises, the floppy disc is separated and moved upward from the disc table 23 and the lower magnetic head 27. Simultaneously with this, the load slider 42 on the cassette holder 34 is slid in the direction of arrow a against the load slider spring 43 by the slide plate 45 which has been slid in the direction of arrow a, and the arm 26 of the head moving mechanism 24 is rotated upward with respect to the cassette holder 34 by the load arm 41 so that the upper magnetic head 27 is separated upward from the floppy disc in the disc cassette 91.

At this time, the rack 42a of the load slider 42 rotates the pinion 31a of the rotary damper 31 backward. However, since the rotary damper 31 acts as a one-way clutch little load is established during the reverse rotation. As a result, the slide plate 45 can slide the load slider 42 smoothly in the direction of arrow a.

When the slide plate 45 is slid in the direction of arrow a to the returned position of FIG. 16, the trigger arm 37 is turned in the direction of arrow c' by the trigger arm spring 39, and comes again into engagement with the locked member 50 so that the slide plate 45 is locked again in the returned position.

As shown in FIGS. 14 and 16, the front end face 91a of the disc cassette 91 is pushed in the direction of arrow a' by the trigger arm 37 turned in the direction of arrow c', so that the disc cassette 91 is automatically discharged in the direction of arrow a' from between the pair of cassette insertion guides 34a of the cassette holder 34 which is elevated to the elevated position.

When the output cam 61 is subsequently rotated in the direction of arrow d and is returned to the returned position, as indicated by solid lines in FIG. 17, the motor 58 is automatically stopped, ending the auto-ejecting operations.

The auto-eject motor 55 will now be described in detail with reference to FIGS. 4 to 12.

First, a housing 62 is molded of a synthetic resin, and the motor 58 and the output camshaft 59 which is molded integrally of a synthetic resin or the like, are mounted between the rear end 62a and the front end 62b of the housing 62 at substantially the same height and in parallel with each other.

The housing 62 has one inner side portion 62c formed wholly as a gear box 63. The leading end of a motor shaft 58a of the motor 58 and the cam gear 60 which is molded integrally with the leading end 59a of the output camshaft 59, are inserted into this position. The gear box 63 has a side covered with a removable cover 64.

In the gear box 63 between the motor shaft 58a and the cam gear 60 a gear train 65 functions as a reduction gear mechanism. This gear train 65 is composed of a plurality of groups of flat gears. The cam gear 60 is exposed to the side from an arcuate notch 66 formed in the cover 64. The output cam 61 acts as an eccentric pin which is molded integrally with the side of the cam gear 60 and is adapted to rotate in the direction of arrow d outside of one side portion of the housing 62.

A bearing portion 67 is molded integrally with the front end 62b of the housing 62, and this housing 62 is provided at its other end portion with a notch 68, located to the side of the bearing portion 67. Thus, the output camshaft 59 is inserted into the bearing portion 67 from the side portion 62c so that its other end 59b is interposed in the notch 68. The output camshaft 59 is prevented from coming out of the bearing portion 67 by a washer 69 fitted on the other end 59b of the output camshaft 59 and the cam gear 60 at the leading end 59a.

The housing 62 is provided with a recess 70 at its other side 62d between the motor 58 and the output camshaft 62. A microswitch 71 which is inserted from the other side portion 62d and mounted in the recess detects the position of the output cam 61. This microswitch 71 has an actuator 71a inserted into the notch 68.

Figure 10C:
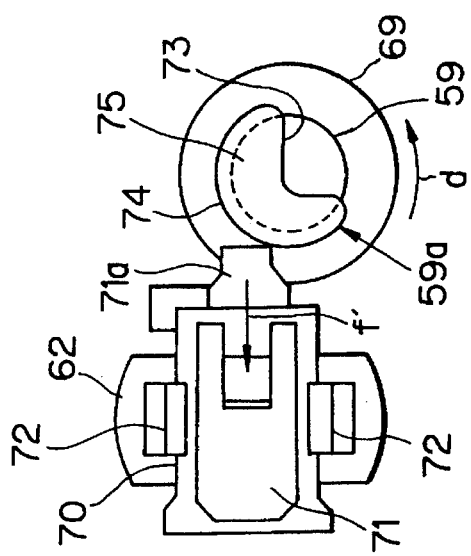
FIG. 10(A) is a view taken in the direction of arrows E—E of FIG. 10, and FIGS. 10(B) and 10(C) are diagrams showing how a microswitch is actuated by a switch actuating cam.
Figure 10B:
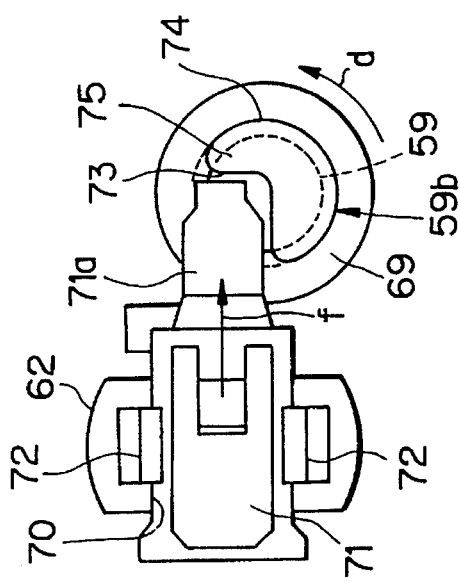
Figure 10A:
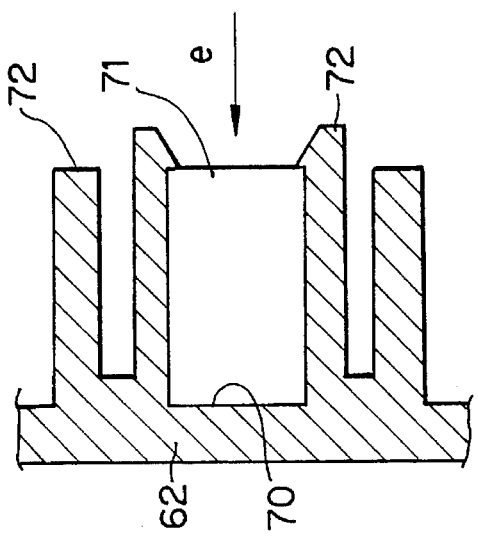

As shown in FIG. 10, the microswitch 71 is inserted in the direction of arrow e into the recess 70 against a pair of retaining pawls 72 which are molded integrally with the housing 62, so that it is retained in place by the retaining pawls 72. Thus, the microswitch 71 can be mounted in the recess 70 in the direction of arrow e with a single action. The microswitch 71 may alternatively be press-fitted in the recess 70.

The actuator 71a of the microswitch 71 inserted into the notch 68 is arranged perpendicularly to the other end 59b of the output camshaft 59. This other end 59b is provided with a switch actuating cam 75 which is composed of a generally right-angled notch 73 and a cylindrical face 74.

The housing 62 is provided in the top face 62e of its other side 62d and rear end 62a with a notch 76 which extends across the motor 58 and the microswitch 71. In this notch 76, there are a pair of input/output terminals 58b of the motor 58 and a pair of input/output terminals 71b of the microswitch 71, which are positioned close to each other.

Figure 2:
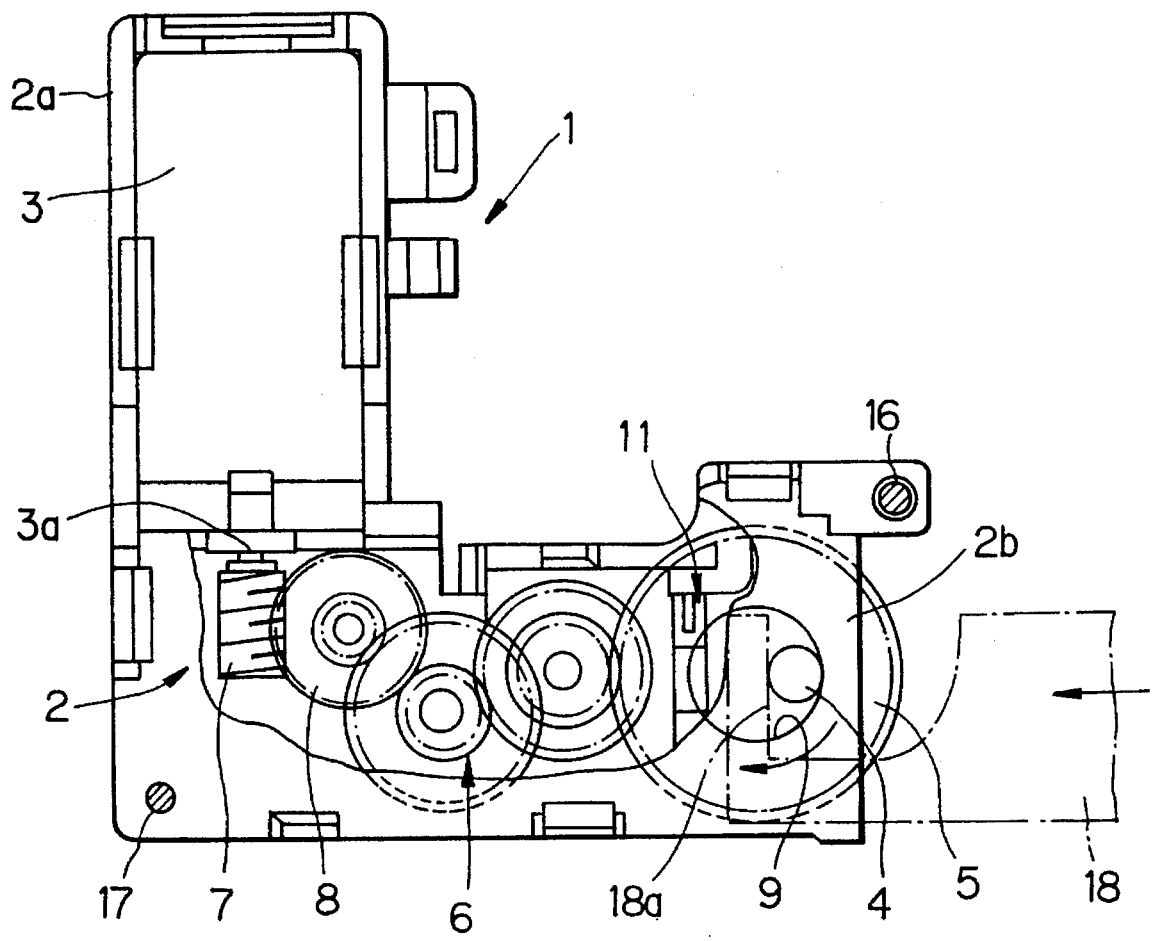
FIG. 2 is a partially cut-away bottom view of FIG. 1.
Figure 3:
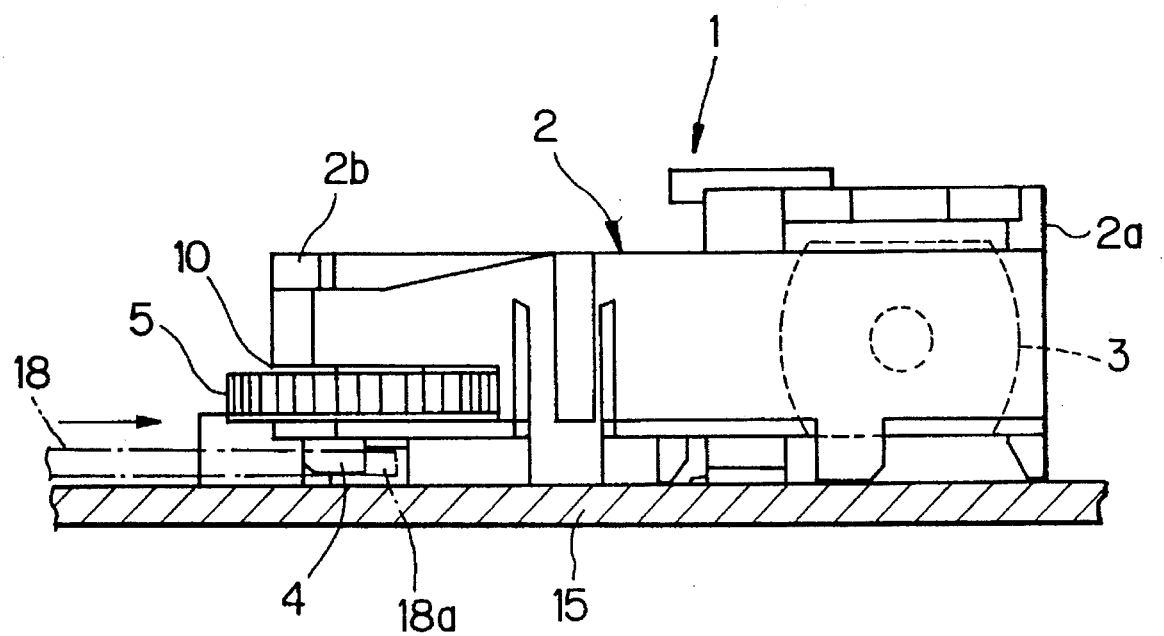
FIG. 3 is a side elevation of FIG. 1.

By virtue of the construction described above, the auto-eject motor 55 is given the generally square top plan shape and a flattened (low profile) construction so that it is made far smaller and lighter than the auto-eject motor of the prior art, such as shown in FIGS. 1 to 3.

The flexible printed-circuit board 83 has its one end 83a inserted horizontally into the notch 76 of the housing 62 and has its three wiring patterns 83c soldered in series to the two pairs of input/output terminals 58b and 71b.

Since the input/output terminals 58b and 71b of the motor 58 and the microswitch 71 are arranged close to each other, they can be easily connected to the flexible printed circuit board 83.

The housing 62 is further provided between the motor 58 and the output camshaft 59 with a screw insertion hole 77 which extends vertically through the housing 62 and a dowel guide 78 formed in the bottom face 62f of the housing 62. Moreover, the bottom face 62 of the auto-eject motor 55 is disposed horizontally on the chassis 21 with the guide pin 57 fitted upward in the guide hole 78. The motor arrangement is screwed down onto the chassis 21 by the screw 56 which is inserted downward into the screw insertion hole 77.

The space between the motor 58 and the output camshaft 59 is effectively used to permit the auto-eject motor to be fastened to the chassis 21.

The motor 58, the output camshaft 59 and the output cam 61 are mounted on the chassis 21 so that the camshaft 59 is horizontal and extends in a direction normal to the driven plate 49 of the slide plate 45.

The other end 83b of the flexible printed-circuit board 83 is inserted into the connector 84 of the circuit board 81 to wire the motor 58 and the microswitch 71.

Since, at this time, the input/output terminals 58b and 71b of the motor 58 and the microswitch 71 are positioned close to each other, the spacing between the auto-eject motor 55 of the flexible printed-circuit board 83 and the circuit board 81 can be drastically reduced. As shown in FIG. 7, a (not-shown) cover is attached to the upper portion of the chassis 21 with an insulating sheet 85 being laid over the flexible printed-circuit board 83.

Figure 12:
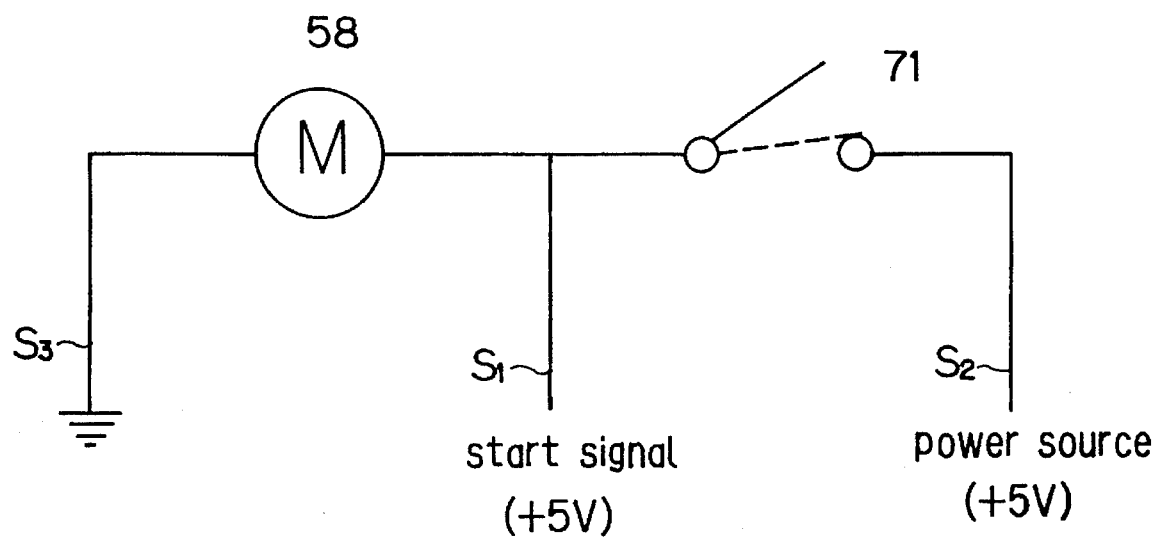
FIG. 12 is a top plan view showing the power circuit of the auto-eject motor.
Figure 13:
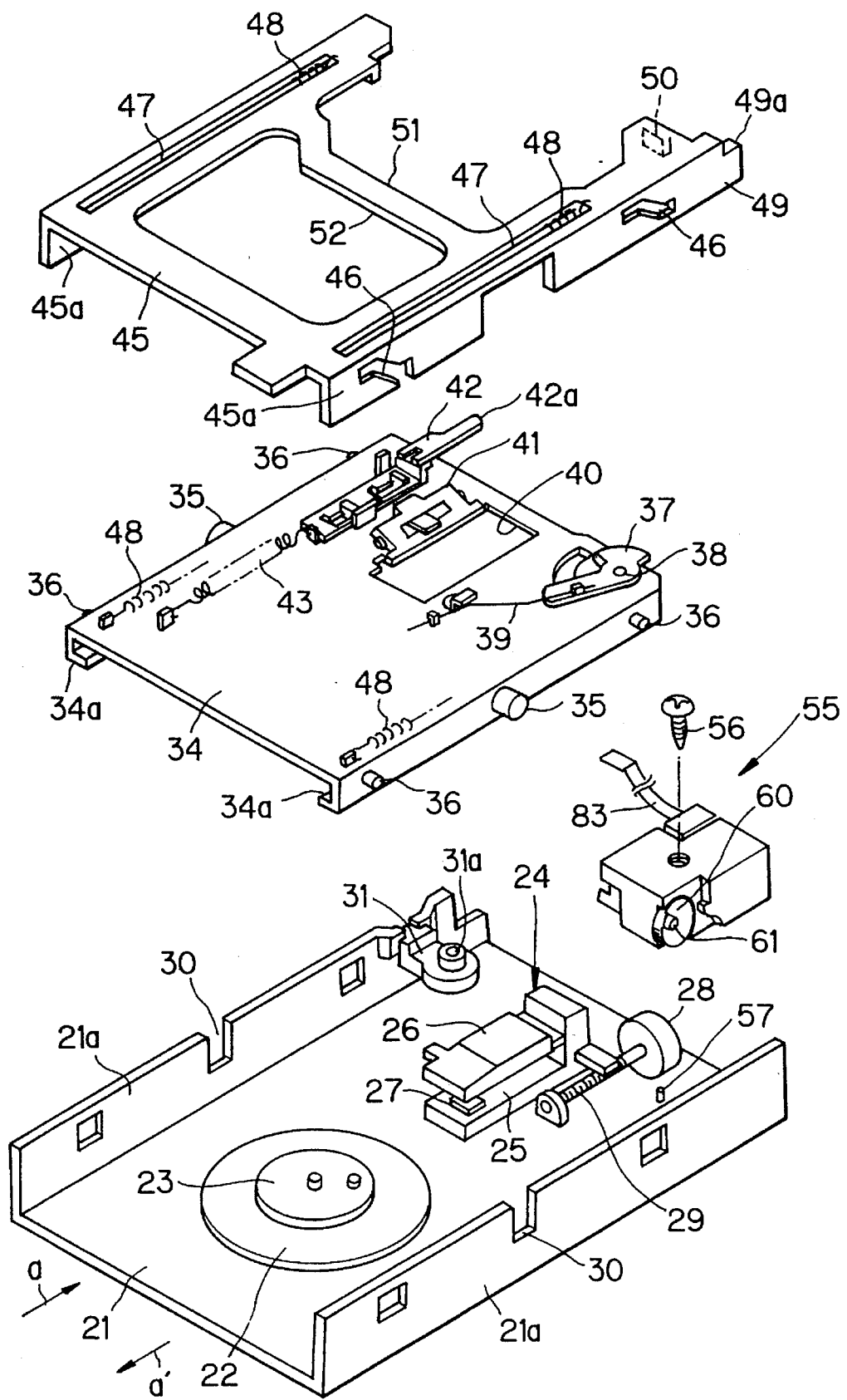
FIG. 13 is an exploded perspective view showing an auto-eject device for a disc player.

The power circuit of the motor 58 is constructed, as shown in FIG. 12, to include a start signal input circuit $S_1$, a power input circuit $S_2$ connected in series with the microswitch 71, and an earth circuit $S_3$.

The operations of the auto-eject motor 55 thus constructed will now be described.

Figure 4:
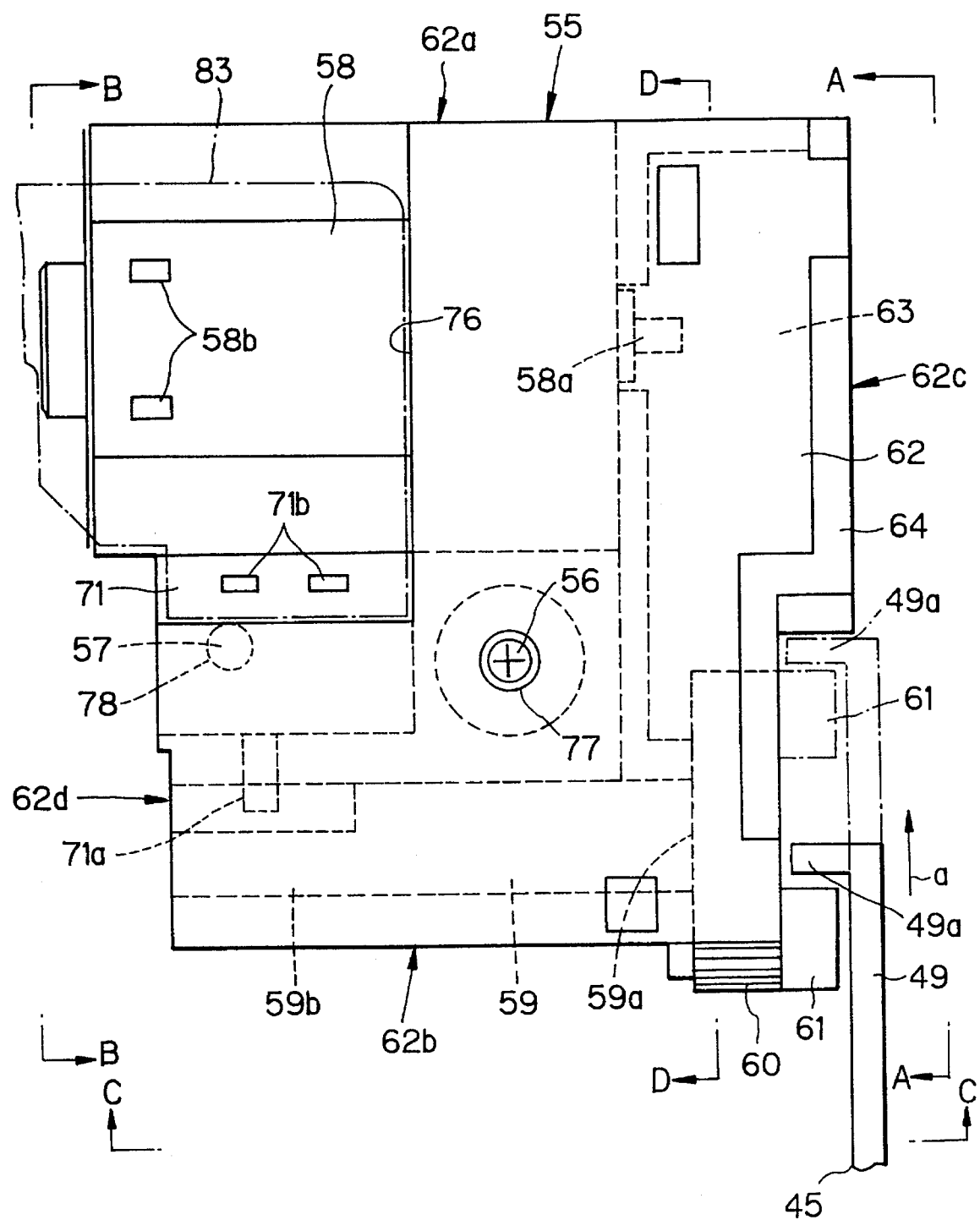
FIG. 4 is a top plan view showing the auto-eject motor according to one embodiment of the present invention.
Figure 5:
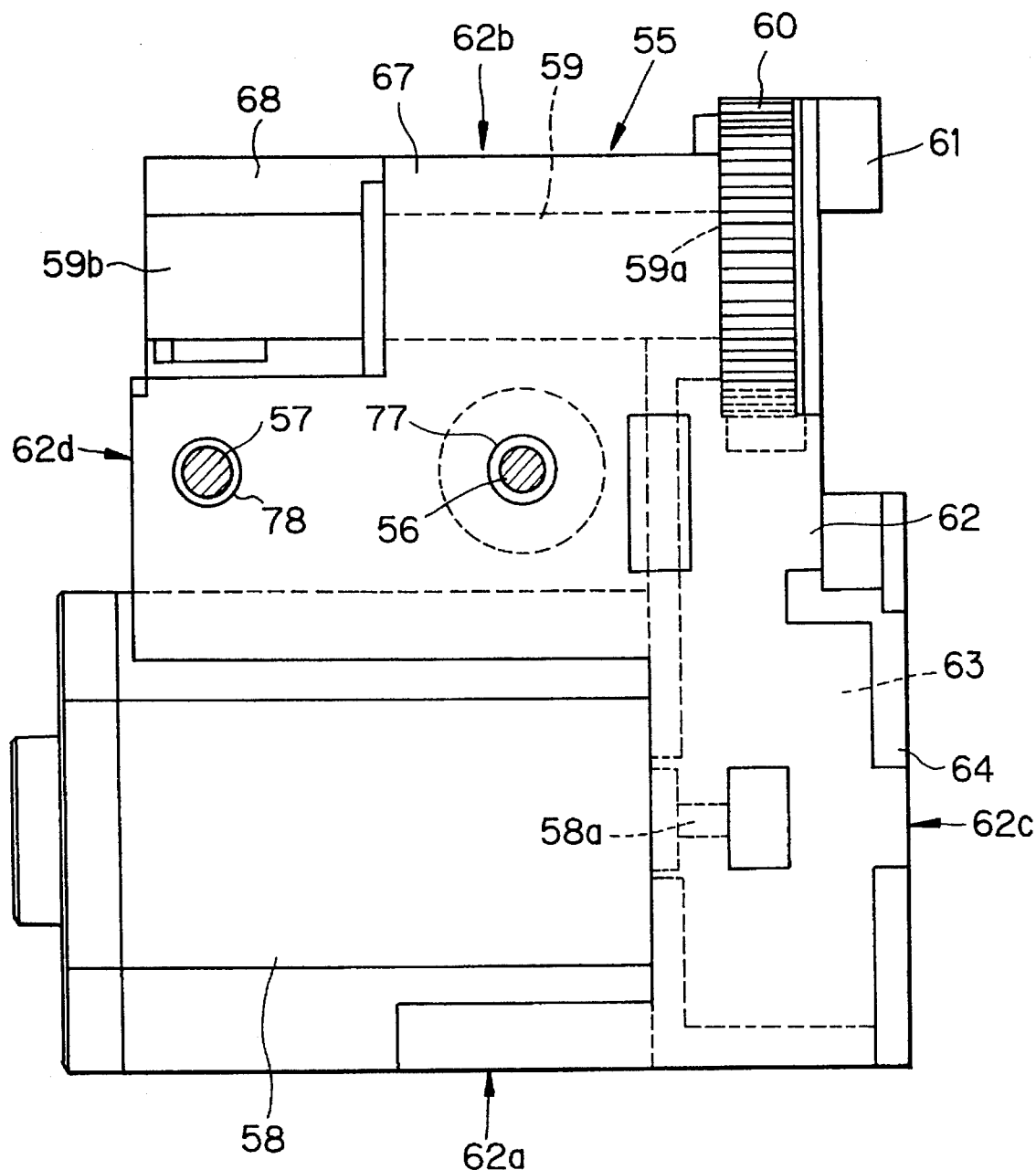
FIG. 5 is a bottom view of the embodiment shown in FIG. 4.
Figure 6:
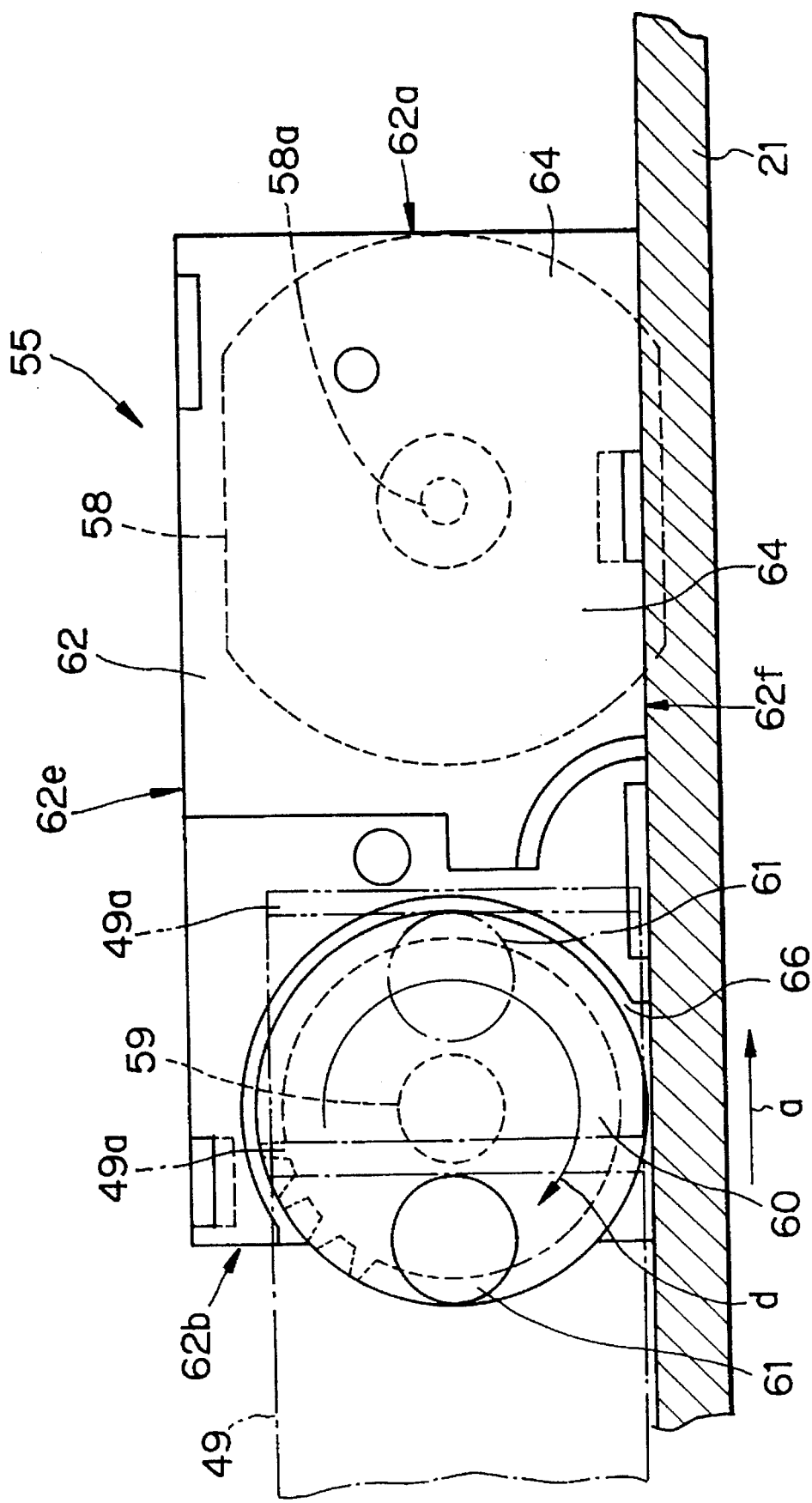
FIG. 6 is a view taken in the direction of arrows A—A of FIG. 4.
Figure 11:
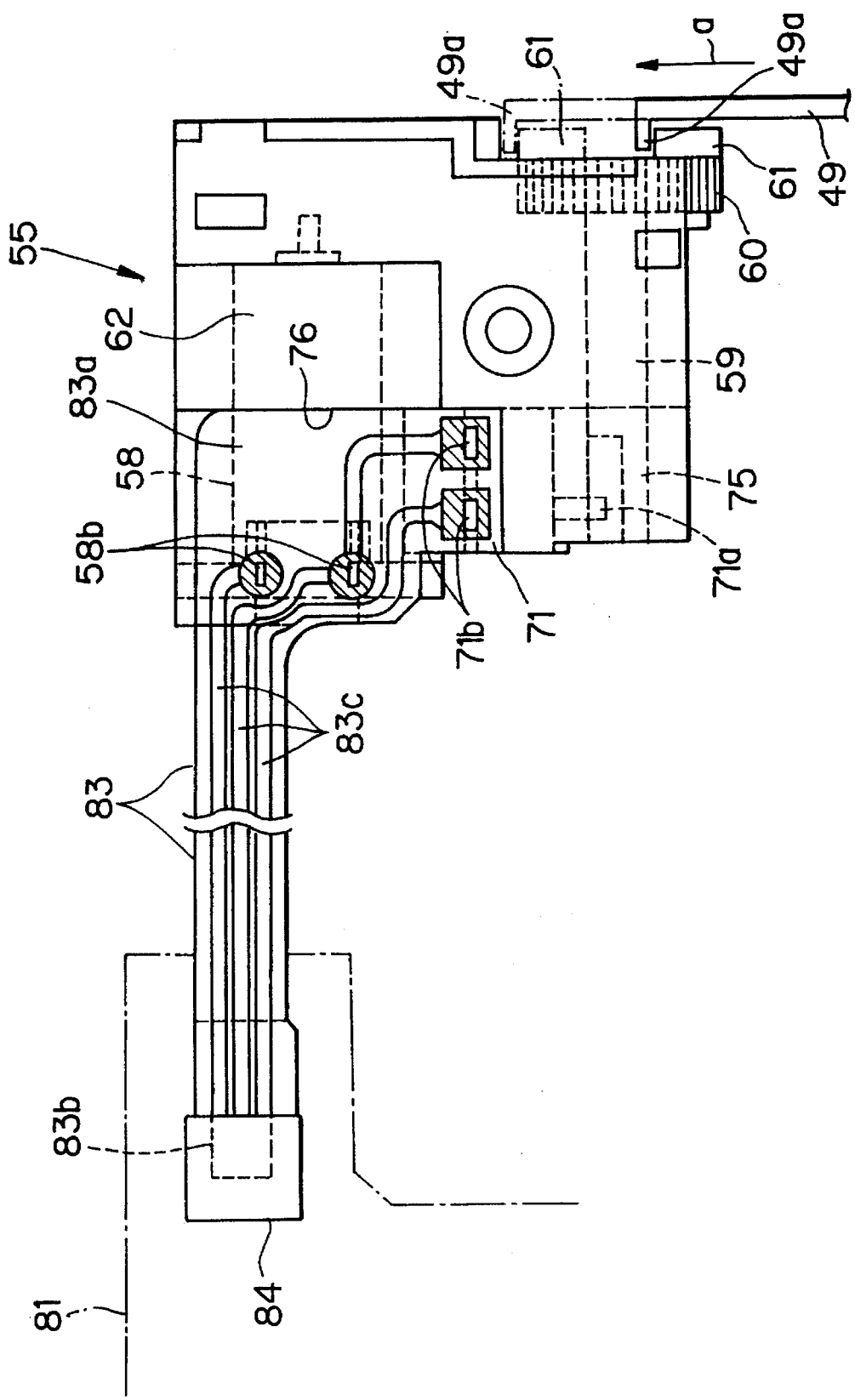
FIG. 11 is a top plan view showing how the auto-eject and circuit board are connected by a flexible printed circuit board.

In the first case in which the output cam 61 is returned to the returned position, as indicated by solid lines in FIGS. 4, 6 and 11, the actuator 71a of the microswitch 71 is caused to protrude in the direction of arrow f by its built-in spring into the notch 73 of the cam 75 of the output camshaft 59, and the power input circuit $S_2$ shown in FIG. 12 is conditioned to assume an OFF position.

When the eject switch is turned ON, a start signal (+5 V) is inputted for a predetermined time period to the start signal input circuit $S_1$, as shown in FIG. 12, to drive the motor 58.

Then, the output camshaft 61 is rotationally driven in the direction of arrow d from the returned position, as shown in FIG. 10(C), through the gear train 65 by the motor 58 so that the output cam 61 starts its rotation in the direction of arrow d from the returned position, as indicated by solid lines in FIGS. 4, 6 and 11.

When the output camshaft 59 starts its rotation in the direction of arrow d, the cam 75 raises the actuator 71a of the microswitch 71 in the direction of arrow f' against the built-in spring to turn ON the power input circuit $S_2$ shown in FIG. 12.

Then, the motor 58 is fed with the power (+5 V) and is continuously driven to rotate the input/output shaft 59 continuously in the direction of arrow d. The cam 75 pushes the actuator 71a continuously in the direction of arrow f' with the cylindrical face 74, as shown in FIG. 10(C), so that the power input circuit $S_2$ shown in FIG. 12 is left OFF. After the power is supplied, the start signal is cut.

When the output cam 61 is then rotated one turn and returned to the returned position, as indicated by solid lines in FIGS. 4, 6 and 11, the output cam shaft 59 is returned to the returned position, as shown in FIG. 10(B). Then, the actuator 71a of the microswitch 71 is protruded again in the direction of arrow f by the built-in spring so that the power input circuit $S_2$ shown in FIG. 12 is turned OFF to detect the returned position of the output cam 61 by the microswitch 71.

The power fed to the motor 58 is interrupted to stop the motor 58 so that the output camshaft 58 and the output cam 61 are individually stopped in the returned positions, as shown in FIGS. 4, 6 and 11 and in FIG. 10(B).

While the output cam 61 is being rotated in the direction of arrow d from the returned position, as indicated by solid lines in FIGS. 4, 6 and 11, to a half-rotation position, as indicated by single-dotted lines, it drives the cam follower 49a of the driven plate 49 of the slide plate 45 in the direction of arrow a so that the slide plate 45 is slid in the direction of arrow a from the forwarded position, as indicated by solid lines in FIGS. 4 and 11 and by single-dotted lines in FIG. 6, to the returned position, as indicated by single-dotted lines in FIGS. 4 and 11 and by double-dotted lines in FIG. 6, to effect the aforementioned auto-ejecting operations.

Although the present invention has been described in connection with only one embodiment, it should not be limited to the foregoing embodiment and can be modified in various manners without departing from its technical concept.

The disc player auto-eject device thus constructed according to the present invention has the following merits.

The motor of the auto-eject motor and the output camshaft are arranged in parallel with each other to reduce the size. The auto-eject motor is so mounted on the chassis that the motor and the output camshaft are in parallel with the chassis, thereby reducing the thickness. When the auto-eject motor is mounted on the chassis, the output camshaft is arranged normal to the driven plate of the loading drive member so that the auto-eject motor and the loading drive member can be assembled and disassembled with respect to the chassis without any mutual restriction. As a result, remarkable reductions in the entire size and thickness of the disc player auto-eject device can be achieved, and the loading drive member and the auto-eject motor can be easily assembled and disassembled for maintenance, inspection and repair.

The motor and the auto-eject motor and the output camshaft are arranged in parallel and substantially in phase with each other, and the reduction mechanism is arranged between the leading end of the motor shaft of the motor and the cam gear fixed with the output cam on the leading end of the output camshaft. In addition, the housing of the auto-eject motor is screwed to the chassis between the motor and the output camshaft. As a result, the auto-eject motor can be given a generally square top plan shape and a flattened construction. Moreover, the auto-eject motor can be screwed easily and stably to the chassis by making effective use of the space between the motor and the output camshaft.

The switch actuating cam for actuating the switch to detect the position of the output cam is disposed on that end portion of the output camshaft of the auto-eject motor, which is opposed to the output cam. As a result, the output camshaft can also act as the switch actuating member to simplify the structure and reduce the cost.

What is claimed is:

1. A disc driving apparatus for driving a disc recording medium accommodated in a disc cassette comprising:

a chassis having a disc table for rotating said disc recording medium;

a cassette holder for holding said disc cassette and operative to move in a first direction which is vertical with respect to said disc table;

a slide plate slidably connected to said cassette holder and having a link portion;

a box-like motor assembly unit which can be detachably fastened as an individual unit to said chassis without interference with said slide plate, said motor assembly unit comprising:

a motor, said motor having an output shaft which is normal to said first direction;

a cam shaft, said cam shaft being parallel with said output shaft;

a reduction gear operatively interconnecting said output shaft and said cam shaft to establish a drive connection therebetween;

a first cam member connected to a first end of said cam shaft and operative to rotate in accordance with a rotation of said output cam shaft and said cam gear output shaft of said motor said first cam member having a connecting portion which engages said link portion to provide an operative connection with said slide plate and so that said slide plate is moved with respect to said chassis, said output cam member being rotatable about an axis which is parallel to said output shaft of said motor;

switch means;

a second cam which is connected to a second end of said cam shaft, said second cam being operatively connected with said switch means to cause said switch means to selectively switch between an OFF position and an ON position; and eject means, responsive to said switch means, for ejecting said disc cassette on the basis of the movement of said slide means.

2. The disc driving apparatus according to claim 1, wherein said output shaft of the motor and said camshaft are positioned in a plane which is parallel with a plane within which said slide plate is slidable and wherein said reduction gear is mounted between said output shaft and said cam shaft.

3. The disc driving apparatus according to claim 2, wherein the motor assembly is detachably connected to the chassis by a screw which passes through said motor assembly at a location between said output shaft and said cam shaft.

4. The disc driving apparatus according to claim 1, wherein said switch means comprises a microswitch which is in contact with a shaped cam surface of a switch actuator cam portion of said second cam, for detecting an angular position of said cam shaft.

5. A disc driving apparatus comprising:

a chassis on which a disc table is mounted;

a slide plate mounted for reciprocal movement on said chassis;

a cassette holder operatively connected with said slide plate and arranged to be moved vertically with respect the disc table in response to reciprocal movement of said slide plate;

a motor arrangement which is detachably connected to said chassis and operatively connected with said slide plate, said motor arrangement comprising:

an essentially rectangular housing formed of a synthetic resin;

a motor having an output shaft, said motor being disposed in one corner of said housing;

an output camshaft supported within said housing by a bearing portion molded into a front end of said housing;

a gear box disposed in said housing and providing a drive connection between the output shaft of said motor and said output camshaft, said gear box extending along one side of said housing;

means defining a first arcuate notch in said housing;

a cam gear located outside of said housing and received in said arcuate notch, said cam gear being fixedly connected to a first end of said output cam shaft and providing a drive connection between said;

means defining a second recess in said housing;

a microswitch disposed in said recess within said housing;

a switch actuating cam fixed to a second end of said output camshaft, said switch actuating cam being located within said housing and having a cylindrical face and an angled notch portion, said switch actuating cam being in operative contact with said microswitch; and means defining a screw insertion hole which extends through said housing and which passes between said motor and said output cam shaft, said screw insertion hole receiving a screw which detachably fastens said housing to said chassis.

* * * * *